Patented July 25, 1933

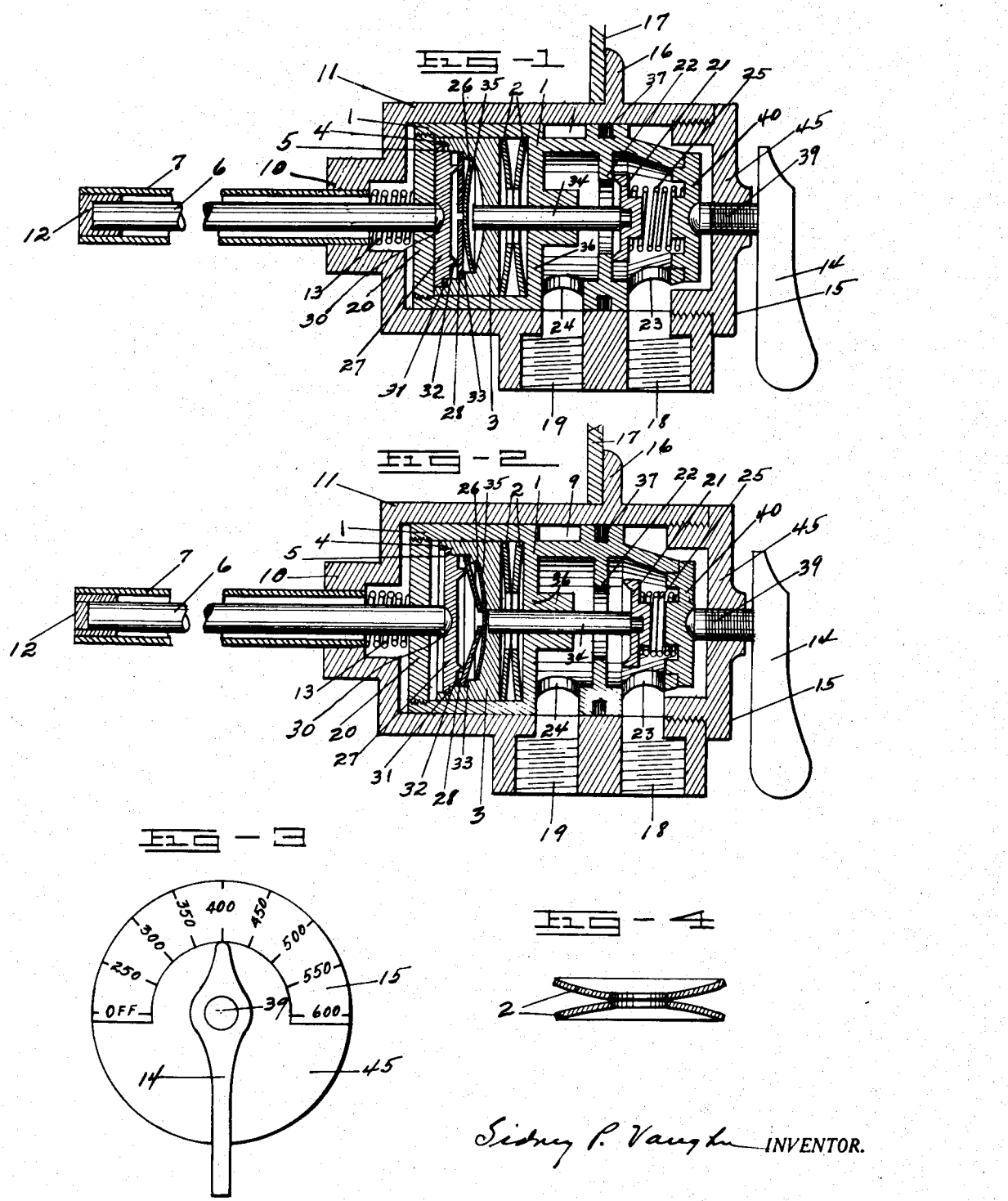

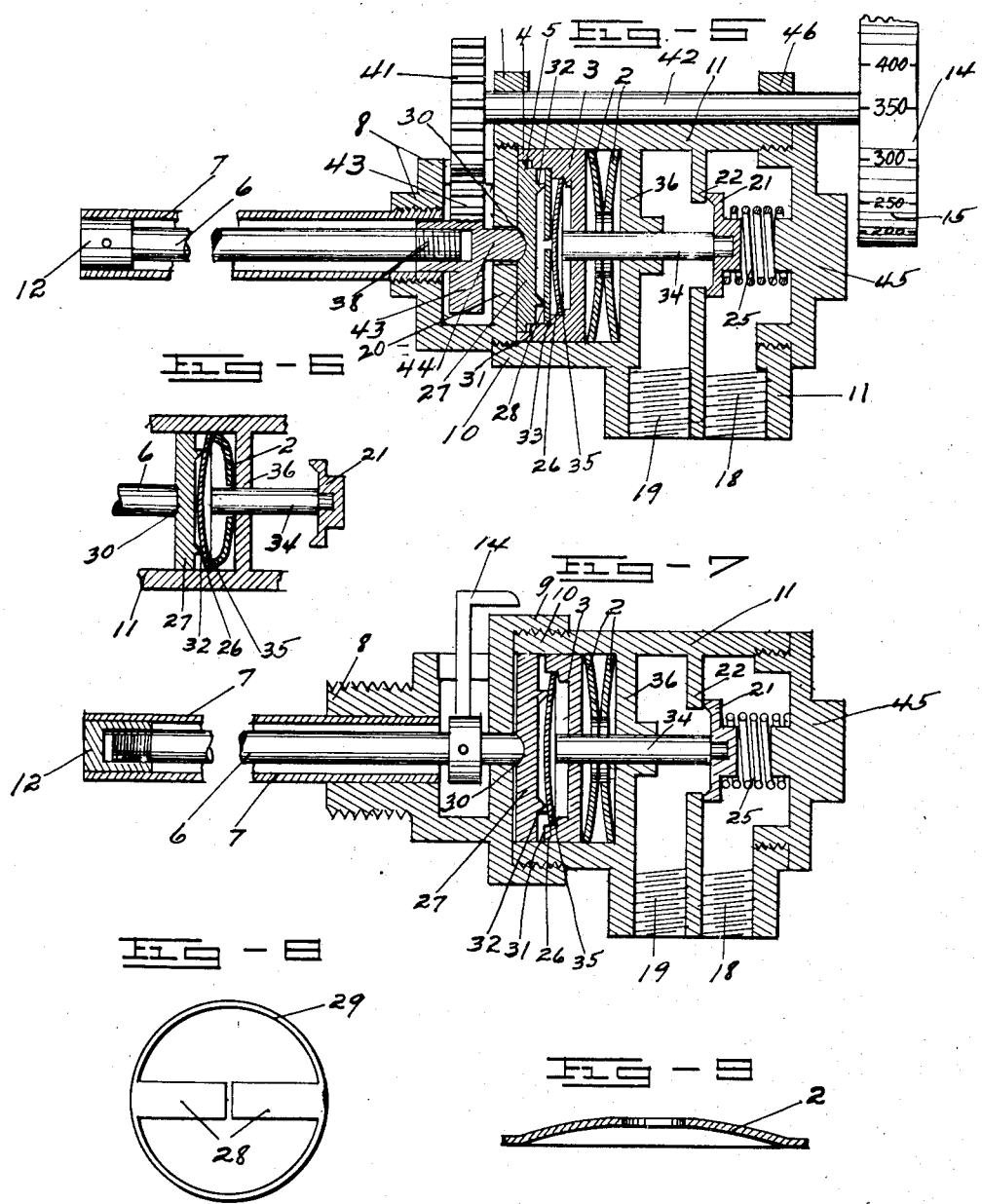

1,919,265

UNITED STATES PATENT OFFICE

SIDNEY P. VAUGHN, OF THE UNITED STATES NAVY, ACKERMAN, MISSISSIPPI, ASSIGNOR TO GRAYSON HEAT CONTROL, INC., OF LYNWOOD, CALIFORNIA, A CORPORATION OF CALIFORNIA

THERMOSTAT

Application filed November 19, 1930. Serial No. 496,792.

(GRANTED UNDER THE ACT OF MARCH 3, 1883, AS AMENDED APRIL 30, 1928; 370 O. G. 757)

I agree that the invention may be manufactured and used by or for the government for governmental purposes without the payment to me of any royalty thereon.

This invention relates to thermostats adapted to the requirements of oven regulators, water heaters and similar devices in which a wide range of temperature regulation is desired. The invention is more particularly applicable to thermostats of the snap action type employing what is known as a "klicker disk" or overcenter spring disk actuated by thermal responsive elements to open and close a valve with a snap action, such as the thermostats described in Patent No. 1,699,468, dated 15 Jan. 1929, and Patent No. 1,744,465 dated 21 Jan. 1930, to which reference should be made for a full understanding of the general principles. Throughout these specifications and the accompanying drawings the reference numbers used correspond to reference numbers in the latter patent wherever the parts are identical or perform the same function.

Heretofore the opening of the valve in thermostats of the type employing a klicker disk to open and close the valve has been limited to the distance traveled by the center of the disk. Due to the arrangement and construction the thermostat is normally adapted only to a very narrow range of temperature adjustment such as from 0 to 200 degrees Fahrenheit and is not adapted to temperature ranges such as is obtained in ovens and furnaces where the temperature may run as high as 1500 degrees Fahrenheit.

The principal object in this invention is to provide in thermostats of the type described in the above named patents, a very inexpensive and simple device whereby the temperature range may be greatly increased without causing any abnormal strains in the klicker disk mechanism or strains that would prevent the thermostat functioning properly.

Another object is to provide combination snap action and graduating means in thermostats of the type described in the above patents whereby the valve opening is greatly increased when the temperature range is high, or, in other words, after the valve has been snapped open by the klicker disk it will continue to open still further in response to the action of the thermal responsive element.

A further object is to provide a novel means of temperature adjustment applicable to thermostats adapted to the requirements of ovens and furnaces where it is desired that the regulating device be on the outside of the oven and present a neat appearance.

The foregoing, together with such other objects as may hereinafter appear, or, are incident of my invention, I obtain by means of a construction described herein and illustrated in the accompanying drawings wherein:

Fig. 1 is a central longitudinal section through a thermally controlled gas valve for ovens made in accordance with my invention and showing the position of the parts when the valve is closed.

Fig. 2 is the same as Fig. 1, but shows the position of the parts when the valve is open.

Fig. 3 is a right end view of Fig. 1 showing the temperature regulating device.

Fig. 4 is a section through a disk type of spring which forms the principal feature of this invention.

Fig. 5 is a central longitudinal section through a modified form of thermostat embodying my invention.

Fig. 6 is a longitudinal section through a modified form of snap action device.

Fig. 7 is a central longitudinal section through another modified form of thermostat embodying my invention and particularly suitable for water heaters and the like.

Fig. 8 is a plan view of the amplification levers used in the thermostat.

Fig. 9 is a section through a modified form of disk spring.

Similar reference numbers are applied to corresponding parts throughout the several views.

The device of the present invention is in the nature of an improvement on the thermostats disclosed in the patents named above.

While the thermostats disclosed in the above patents operate efficiently and satisfactorily at low temperature ranges, they are not satisfactory for high temperature ranges such as 1000 degrees Fahrenheit due to the fact that the snap acting mechanism may be permanently distorted when actuated from one temperature extreme to the other by the thermal responsive elements.

The thermostats illustrated and embodying my invention employs the general features of the thermostats described in the above named patents and comprises the usual thermal responsive elements 6 and 7. The element 6 has a low coefficient of expansion and may be made of a rod of invar. The tubular element 7 has a high coefficient of expansion and may be made out of copper. The tube 7 is suitably fixed in the bore of a neck extension 10 of the main valve body 11. The rod 6 is secured at its outer end in the outer end of the tube 7 in the recess of a plug 12 secured in the end of the tube. By virtue of this connection it is evident that any expansion and contraction of the tube 7 results in an endwise movement of the rod 6. The thermal responsive elements 6 and 7 are placed in the medium of which it is desired to control the temperature.

The main valve body 11 has an inlet 18 which may be connected to the gas supply and an outlet 19 which may be connected to the burner. It also has a flange 16 which may be used to fasten the valve body to the wall of the oven designated by the numeral 17. The inside of the main valve body 11 is bored smooth to receive a cylindrical piston element or secondary valve body 1 which carries the entire valve and snap acting assembly. The secondary valve body 1 has a sliding fit in the main valve body 11 to permit adjustments for temperature regulation as will be more fully described herein.

The flow of the gas from the inlet to the outlet in the main valve body is controlled by a poppet or mushroom type valve 21 movable to and from its seat 22 formed in a wall embodied in the secondary valve body 1 between the inlet and outlet ports 23 and 24 which align with the inlet and outlet 18 and 19 of the main body 11. A ring packing 37 is provided in an annular groove formed in the outer wall of the secondary valve body 1 between the inlet and outlet ports 23 and 24 to prevent leakage of gas from the inlet 18 to the outlet 19 in the main valve body.

The valve is held normally seated by a coiled compression spring 25 acting between the valve and a plug 40 fitted in the end of the secondary valve body 1 and concentrically arranged with reference to a plug 45 screwed into the end of the main valve body 11. A cylindrical chamber is bored in the other end of the secondary valve body 1 and is separated from the outlet gas passages by a wall 36 embodying a guide through which the valve stem 34 passes. The outer end of the cylindrical chamber is closed by a plug 20 provided with a central opening through which the thermostatic rod 6 passes. A piston shaped member 3 is arranged to slide lengthwise the chamber and has its skirt end 4 held against the plug 20 by a compressed disk spring 2 acting between the bottom of the piston 3 and the wall 36 separating the chamber from the gas passages. The piston member 3 and the disk spring 2 form the basic idea of this invention and their action will be more fully described hereinafter.

The thermostatic snap acting device described in Patent No. 1,744,465, is assembled in the bore of the piston. It comprises a normally convexo-concave spring metal diaphragm 26, called a klicker disk, arranged to snap over dead center from a convexo-concave form when a pressure is applied by the thermostatic rod 6 to the convex side, and to regain its normal form when the pressure is removed. The disk is arranged to rest loosely on an annular shoulder 35 formed by the juncture of the concave bottom of the piston bore with the inner wall of the skirt. Since the movement of the rod 6 is so slight some means of amplification is required, which consists of a plunger 27 and a pair of flat resilient levers 28 disposed in the order named between the end of the rod 6 and the normally convex side of the disk 26. The plunger is slidably disposed in the bore of the piston 3 and is centrally counterbored as at 30 to provide a seat for the rounded end of the rod 6. The face of the plunger 27 presented to the levers 28 has a projecting annular knife edge shoulder 32 arranged to have line contact with the levers 28 near the outer ends thereof. The levers 28 are formed from a single piece of metal with the outer ends of the levers connected by a ring 29 as illustrated in Fig. 8. The extreme outer ends of the levers bear against an annular shoulder 33 defining a slight increase in the bore of the piston from the bottom out. Since the levers are supported at their extreme outer ends and are borne against by the annular shoulder 32 of the plunger at points near the outer ends it is evident that the levers will have a rocking motion communicated thereto in the movement of the rod 6. The inner ends of the levers rest against the center of the disk 26 and are arranged to apply a pressure at that point sufficient to cause the disk to snap over dead center to a concavo-convex form when acted upon by the rod 6. The stem 34 of the valve passes through a guide formed in the wall 36 and through openings in the disk spring and the bottom of the piston 3 and is arranged in relation to the center of the disk to be operated thereby. In this arrangement any movement of the rod 6 is amplified and transmitted to the center of the disk which in turn operates the valve. In thermostats of this type it is necessary that the temperature variation between opening and closing the valve be kept as small as possible, about 15 degrees Fahrenheit, and in order to attain this it is necessary that the amplification of the rod movement be as great as possible. Within small temperature ranges of say 200 degrees between the maximum and the minimum this is easily accomplished with the type of thermostat described in the above named patents, but where the temperature range may be as high as 1000 degrees between the maximum and the minimum, it is evident that any large amplified movement of the rod 6 would cause a considerable strain in the levers and klicker disk which might distort them permanently and prevent the valve functioning properly unless some means were provided to take care of the movement. This is accomplished in this invention by providing resilient compression springs 2 between the bottom of the piston 3 and the wall 36 which yield only under pressures greater than the pressure necessary to operate the klicker disk. While most any form of compression spring may be used, depending upon the type of thermostat, I prefer to use convexo-concave spring disks, arranged with convex side to convex side as shown, for the reason that it takes a greater pressure to start the yielding of the spring than it does to continue the yielding, or, in other words, the pressure necessary to compress the spring decreases very rapidly as the disks flatten out. This action is the opposite to that obtained with any other form of spring which requires an increase of pressure to continue the compression of the spring. The spring disks 2 should be made out of metal of just sufficient thickness to resist compression until the klicker disk has been snapped into a reverse form and the valve opened. While I have shown only two spring disks back to back to form the spring, any number of spring disks may be used in the manner shown to obtain a greater compression movement. In order to prevent any abnormal strains in the levers 28 and the klicker disk 26 such as would cause a permanent distortion and prevent the valve functioning properly, the outer end of the plunger is flanged as at 5 to make contact with a shoulder 31, formed by enlarging the bore in the outer end of the piston skirt 4, when the plunger has moved a distance sufficient to snap the klicker disk past dead center and open the valve. The pressure caused by any further inward movement of the plunger is communicated direct to the piston, which, due to the yielding of the disk spring 2, moves in the direction of the valve and causes the valve to open still further. This is a very desirable feature especially where the temperature range is very high, and it is desired that the valve pass the maximum amount of gas at the start. The plug 20 in the end of the chamber is provided primarily to take up any lost motion in the transmission train and to partially compress the disk spring 2 in order to make the thermostat more sensitive to temperature changes.

Temperature control is obtained by adjusting the position of the plunger 27 relative to the rod 6. This is accomplished by means of a temperature control device in the plug 45 consisting of a screw 39 which presses against the center of the plug 40 in the outer end of the secondary valve body 1. A handle 14 is attached to the screw for turning it and a pointer is provided to select the desired temperature reading on the dial 15 formed in the face of the plug 45. A clockwise movement of the handle will force the entire secondary valve body assembly toward the rod 6 and increases the temperature range at which the valve will close. An anticlockwise movement of the handle 14 will cause the assembly to move away from the rod by virtue of the action of a coiled compression spring 13 acting between the neck 10 of the main valve body and the plug 20 in the end of the secondary valve body 1, thus reducing the temperature range. It is evident that the position of the plunger 27 relative to the rod 6 determines the distance the rod must travel before the valve is operated.

In operation, assuming that the valve 21 is closed, when the tubular element 7 of the thermostat contracts, the rod element 6 moves slowly inward and causes the plunger 27 to apply a pressure onto the levers 28 near the outer ends thereof. The levers 28 being resilient, flex more and more the further the plunger 27 is moved inwardly, until they exert sufficient pressure at the center of the disk 26 to snap the same over dead center. Now, the klicker disk 26 has a peculiar property of requiring a greater pressure to force the same over dead center than it does to keep it from snapping back to its normal shape. Because of that, the levers 28, after they have snapped the disk past dead center, serve to hold the same against snapping back, the levers resting still in contact with the disk and exerting a pressure thereon. When the disk is snapped over dead center it makes contact with the valve stem and of course opens the valve and permits gas to pass to the burner. Any further inward movement of the rod 6 causes the flange 5 on the plunger 27 to make contact with the shoulder 31 in the piston 3 and pushes the piston with the entire klicker disk assembly toward the valve due to the yielding of the disk spring 2 and causes the valve to open still further to provide a larger gas passage through the valve.

As the tubular element 7 is heated it gradually expands and retracts the rod 6. At the beginning of this movement the piston 3 moves away from the valve which closes slowly until the piston skirt 4 makes contact with the plug 20. Any further retraction of the rod 6 relieves the pressure on the plunger 27 and the levers 28. The moment the pressure of the levers against the center of the disk is light enough the disk snaps back into a convexo-concave form and permits the valve to close with a snap action, shutting off the flow of the gas to the burner.

Before proceeding with certain other novel features of the present invention, attention is called to Fig. 5 illustrating a modification of the thermostat, in which the main valve body 11 and the secondary valve body 1 described above are combined to form a single valve body 11. The piston 3 carrying the klicker disk assembly, and the disk spring 2, are arranged in a cylindrical chamber formed in the inner end of the valve body 11 and separated from the gas passages by a wall 36 embodying the valve stem guide. The klicker disk assembly is held in operative position by a plug 20 connected to an internally threaded neck 8 by a yoke in which is disposed the temperature adjustment screw 43. The inner end of the thermostatic tube 7 is threaded and screwed in the neck 8 and the outer end is closed by a plug 12 secured therein to which the outer end of the rod 6 is secured against rotation. The inner end of the rod 6 is threaded to which is screwed an internally threaded gear wheel 43, the inner end of which terminates in a shaft 44 passing through a hole in the plug 20 and seating itself in a recess 30 formed in the plunger 27. The gear wheel can be rotated on the rod 6 to adjust itself along the threads of the rod 6, and, in effect, shorten or lengthen the rod 6 with relation to the plunger 27. As a general rule this portion of the thermostat will be inside of the oven and some means must be provided for making temperature adjustments from the outside of the oven. This is accomplished by passing a spindle 42 through bearings 46 formed in the outside walls of the valve body 11 and securing to its inner end a gear wheel 41 which meshes with the gear wheel 43. A wheel 14 is secured to the outer end of the spindle and carries on its rim a band scale 15 graduated in degrees to act as a guide in determining the adjustments desired. It is evident that turning the wheel 14 will, acting through the gear train, turn the gear wheel 43 which, in effect, increases or decreases the length of the rod 6 in relation to the plunger 27 and thereby advances or delays the opening or closing of the valve. In operation the thermostat functions in the same manner as the one illustrated in Fig. 1.

In Fig. 7 is illustrated the application of my invention to the thermostat illustrated and described in Patent No. 1,744,465, which is particularly adapted to the requirements of water heaters, and reference should be made to that patent for a complete description. The only difference is that the levers 28 in Figs. 1 and 5 have been eliminated and the annular shoulder 32 of the plunger 27 presses directly against the klicker disk 26 near its edge. Due to the resiliency of the disk spring 2 the same action is obtained as would be obtained were the levers 28 used. The operation is the same as that illustrated in Fig. 5.

Fig. 6 illustrates a still further simplification of the application of my invention which is particularly suitable for thermostats where the temperature variation is not required to be so small. The piston 3 in Figs. 1, 5 and 7, is eliminated entirely and a single disk spring 2 with the convex side resting against the bottom of the bore or wall 36 and having its edges cupped to support the edges of the klicker disk is used in the place of the piston. The annular shoulder 32 of the plunger 27 presses near the edge of the klicker disk. As the pressure on the plunger increases the disk spring gives slightly and when the pressure on the klicker disk is sufficient to snap it over dead center the yielding resistance offered by the disk spring 2 causes the center of the klicker disk to complete its travel to a full concavo-convex form and open the valve. Any further pressure causes the disk spring 2 to yield and permit the klicker disk to move toward the valve.

In Fig. 9 is illustrated a modified form of disk spring in which the center and outer edges are flattened to offer a bearing surface which will not cut into its seat and ultimately throw the thermostat out of adjustment. This form of disk spring is much less resilient than the disk spring illustrated in Fig. 4 and consequently may be made of thinner metal.

It is believed that the foregoing description conveys a clear understanding of the objects and advantages of my invention. While I have illustrated and described the application thereof to valves it should be understood that there are numerous other possible applications. All legitimate modifications and applications of my invention are therefore to be construed as coming within the scope and spirit of the appended claims.

I claim:

1. In a thermostat, the combination of a thermal responsive element arranged to have movement in event of temperature variation, a lever system arranged to amplify any movement of said thermal responsive element, a valve or other element arranged to be actuated by said lever system, an over-center spring device for causing the lever system when actuated to move the valve or other element to open or closed position with a snap action, and resilient means permitting the fulcrums of said lever system to move in the direction of the force applied to said levers after said valve has been moved to an open position.

2. In a thermostat, the combination of a thermal responsive element arranged to have movement in event of temperature variation, a lever system arranged to amplify any movement of said thermal responsive element, a spring diaphragm disk of substantially convexo-concave form actuated by and arranged in relation to the lever system to snap into a concavo-convex form when a pressure is applied to the convex side by the lever system and to snap back into a convexo-concave form when the pressure is removed, a valve arranged to be actuated by said spring diaphragm disk, and resilient means permitting the fulcrums of the levers in said lever system to move in the direction of the force actuating said levers after said valve has been moved to an open position by the action of the spring diaphragm disk.

3. In a thermostat, the combination of a thermal responsive element arranged to have movement in event of temperature variation, a lever system arranged to amplify any movement of said thermal responsive element, a spring diaphragm disk of substantially convexo-concave form actuated by and arranged in relation to the lever system to snap into a concavo-convex form when a pressure is applied to the convex side by the lever system and to snap back into a convexo-concave form when the pressure is removed, a valve arranged to be actuated by said spring diaphragm disk, and means permitting the lever system and spring diaphragm disk to move in the direction of movement of said thermal responsive element after the valve has been moved to an open position by the action of the spring diaphragm disk.

4. In a thermostat, the combination with a thermostatic element arranged to move according to temperature variations, an amplifier disk of substantially convexo-concave form arranged to snap into a concavo-convex form when a pressure is applied to the convex side and to snap back into a convexo-concave form when the pressure is removed, a plunger engaged directly by said thermostatic element and guided for movement so that it is arranged to exert a pressure on the convex side of the amplifier disk near the edge thereof, a valve or other element arranged to be actuated to an open or closed position by the amplifier disk, and resilient means supporting the edges of the diaphragm disk which permits the said disk to move in the direction of the force applied thereon by the plunger after the said disk has been snapped into a concavo-convex form by the pressure of the plunger thereon.

5. The combination with a device as set forth in claim 1 of adjustment means arranged to advance or delay the opening and closing of said valve or other element by the thermostatic train.

6. In a device of the character described the combination with a thermal-responsive element adapted to move in the event of temperature variation, and a valve or other device to be operated by said element, of a combination snap action and graduating means between the thermal-responsive element and the operated device for operating the latter first abruptly in accordance with a predetermined movement of the thermal-responsive element and thereafter gradually in further movement of said element.

7. In a device of the character described, the combination with a thermal-responsive element adapted to move in the event of temperature variation, and a valve arranged to be operated in accordance with the temperature variation of said element, of a combination snap action and graduating means providing an operating connection between the thermal-responsive element and the valve whereby the valve is arranged to be opened abruptly in accordance with a predetermined movement of the thermal-responsive element and is arranged to be gradually opened further in accordance with further movement of the thermal responsive element in the same direction.

8. A device as set forth in claim 6 wherein the means is so constructed to communicate amplified movement to the device in the abrupt operation and to communicate movement to the device thereafter equal to the movement of the thermal-responsive element.

9. A device as set forth in claim 7 wherein the means is so constructed to communicate amplified movement to the valve in the abrupt operation and to communicate movement to the valve thereafter equal to the movement of the thermal-responsive element.

10. In a thermostatic device, the combination of a thermal-responsive element, a valve or other element arranged to be operated in accordance with movements of the thermal-responsive element, a snap-action element of spring material, a movable support for said snap-action element, means between the snap-action element and the thermal-responsive element for forcing the snap-action element over dead center in a predetermined movement of the thermal-responsive element, said snap-action element being arranged to give abrupt movement in an amplified degree to the valve upon snap action thereof, and means for yieldingly resisting movement of the support, whereby to permit further movement of the valve in accordance with further movement of the thermal-responsive element after the snap action occurs.

11. In a thermostatic device, the combination of a thermal-responsive element, a valve or other element arranged to be operated in accordance with movements of the thermal-responsive element, a snap-action element of spring material, a movable support for said snap-action element, a plunger for transmitting movement from the thermal-responsive element to the snap-action element in such a way as to give amplified abrupt movement to a portion thereof in a predetermined movement of the thermal-responsive element, the plunger being limited in its movement by abutment with the movable support whereby to prevent damage to the snap-action element after snap action thereof, and means for yieldingly resisting movement of the support, whereby to permit further movement of the valve in accordance with further movement of the thermal-responsive element after the snap action occurs.

12. In a thermostatic device, the combination of a thermal-responsive element, a valve or other element arranged to be operated in accordance with movement of the thermal-responsive element, a snap-action element of spring material, a movable support for said snap-action element, and means between the snap-action element and the thermal-responsive element for forcing the snap-action element over dead center in a predetermined movement of the thermal-responsive element, said snap-action element being arranged to give abrupt movement in an amplified degree to the valve upon snap action thereof, movement of the movable support being yieldingly resisted prior to the snap action of the snap-action element, so that further movement of the thermal-responsive element is permitted after the snap action occurs.

13. In a thermostatic device, the combination of a thermal-responsive element, a valve or other element arranged to be operated in accordance with movements of the thermal-responsive element, a snap-action element of spring material, a movable support for said snap-action element and a plunger for transmitting movement from the thermal-responsive element to the snap-action element in such a way as to give amplified abrupt movement to a portion thereof in a predetermined movement of the thermal-responsive element, the plunger being limited in its movement by abutment with the movable support whereby to prevent damage to the snap-action element after snap action thereof, movement of the movable support being yieldingly resisted prior to the snap action of the snap-action element, so that further movement of the thermal-responsive element is permitted after the snap action occurs.

14. A device as set forth in claim 10 wherein the last mentioned means comprises a normally convexo-concave disk of spring material for the purposes stated.

15. A device as set forth in claim 10 wherein the last mentioned means comprises a pair of normally convexo-concave disks of spring material for the purposes stated, the said disks being disposed in opposed relation to one another so as to add the amplitude of movement of the one to that of the other.

16. In a thermostatic device, the combination with a thermostat comprising rod and tube elements, the rod element being adapted to have movement in accordance with temperature changes, an outer valve body having a longitudinal bore, an inner valve body having a close sliding fit in said bore, the tube element being fixed with respect to the outer valve body, the inner valve body having the rod element extending therein, a valve in the inner body controlling communication between inlet and outlet chambers provided in said body, ports in the walls of the inlet and outlet chambers of the inner body registering with inlet and outlet ports in the wall of the outer body, means providing an operating connection between the rod element and the valve for moving the latter in accordance with temperature changes, and a temperature adjustment comprising a screw for moving the inner body on said rod element and relative to the outer body.

17. In a thermostatic device, the combination with a thermostat comprising rod and tube elements, the rod element being adapted to have movement in accordance with temperature changes, an outer valve body, an inner valve body movably disposed in the outer body, the tube element being fixed with respect to the outer valve body, the inner valve body having the rod element extending therein, a valve in the inner body controlling communication between inlet and outlet chambers provided in said body, the inlet and outlet chambers of the inner body being in communication with inlet and outlet passages in the outer body, snap-action means interposed between the rod element and the valve in the inner body for abruptly opening the valve in the event of a predetermined movement of the rod element, and a temperature adjustment comprising a screw for moving the inner valve body relative to the outer valve body whereby to advance or retard the snap action of said means.

18. A device as set forth in claim 17 including yielding means cooperating with the snap-action means so as to permit graduating movement of the valve by further movement of the rod element after the snap action occurs.

19. In a device of the character described, the combination with a thermal-responsive element adapted to move in the event of temperature variation, and a device to be operated by said element, of a combination snap action and graduating means between the thermal-responsive element and the operated device for operating the latter, so that in moving in one direction it is moved first abruptly in accordance with a predetermined movement of the thermal-responsive element and thereafter gradually in further movement of said element, and in moving in the opposite direction it is first moved gradually in the movement of the thermal-responsive element and then abruptly in accordance with a predetermined further movement of said element.

20. In a device of the character described, the combination with a thermal-responsive element adapted to move in the event of temperature variation, and a valve arranged to be operated in accordance with the temperature variation of said element, of a combination snap action and graduating means providing an operating connection between the thermal-responsive element and the valve whereby the valve is arranged to be given an abrupt movement in the functioning of the snap action portion of said means, and gradual movement in the functioning of the graduating portion of said means, said snap-action and graduating means being connected with the thermal-responsive element and the valve so that, in opening, the valve opens abruptly in a predetermined movement of the thermal-responsive element and thereafter gradually opens further in further movement of said element, and, in closing, moves gradually toward closed position in the movement of the thermal-responsive element and thereafter closes abruptly in a predetermined further movement of the thermal-responsive element.

21. A device as set forth in claim 19 wherein the means is so constructed to communicate amplified movement to the device in the abrupt operation thereof by the snap-action portion of said means and to communicate unamplified movement to the device in the gradual operation thereof by the graduating portion of said means.

22. A device as set forth in claim 19 wherein the means is so constructed to communicate amplified movement to the valve in the abrupt operation thereof by the snap-action portion of said means and to communicate unamplified movement to the valve in the gradual operation thereof by the graduating portion of said means.

23. A thermostatic device as set forth in claim 16 including spring means tending normally to move the inner valve body relative to the outer valve body toward the temperature adjustment screw.

24. A thermostatic device as set forth in claim 17 including spring means tending normally to move the inner valve body relative to the outer valve body toward the temperature adjustment screw.

25. In a device of the character described, the combination with a thermal-responsive element adapted to move according to temperature change, of a device to be operated in accordance with the movement of said element, a snap-action mechanism disposed between said element and said device, and means for supporting said mechanism for limited movement bodily with the element toward and away from the device, said mechanism in its movement with the element serving to communicate graduating movement to the device directly proportionate to the movement of said element, and said mechanism when stationary being arranged to have the element move relative thereto whereby to communicate abrupt movement to said device.

26. In a device of the character described, the combination with a thermal-responsive element adapted to move according to temperature change, of a valve casing, a valve movable in said casing to control the flow of fluid between inlet and outlet passages provided in said casing, a snap-action mechanism disposed between said element and said valve, and means supporting said mechanism for limited movement bodily relative to the casing with the element toward and away from the valve, said mechanism in its movement with the element serving to communicate graduating movement to said valve, and said mechanism when stationary being arranged to have the element move with respect thereto to cause snap action thereof, so as to communicate abrupt movement to the valve.

27. In a thermostatic device, the combination of a thermal-responsive element, a device arranged to be operated in accordance with movements of the thermal-responsive element, a snap-action element of spring material, a movable support for said snap-action element, means between the snap-action element and the thermal-responsive element to force the snap-action element over dead center in a predetermined movement of the thermal-responsive element, said snap-action element being disposed to operate the aforesaid device upon snap action thereof, and means for yieldingly resisting movement of said support.

28. In a thermostatic device, the combination of a thermal-responsive element, a device arranged to be operated in accordance with movements of the thermal-responsive element, a snap-action element of spring material, a movable support for said snap-action element, means between the snap-action element and the thermal-responsive element to force the snap-action element over dead center in a predetermined movement of the thermal-responsive element, said snap-action element being disposed to operate the aforesaid device upon snap action thereof, means for limiting movement of the last mentioned means toward the snap-action element, whereby the thermal-responsive element is adapted to communicate movement directly to said support after snap action of the snap-action element.

29. In a thermostatic device, the combination of a thermal-responsive element, a device arranged to be operated in accordance with movements of the thermal-responsive element, a snap-action disk of spring material, a movable support on which the disk rests about the edges thereof, a plunger for transmitting movement from the thermal-responsive element to the snap-action element in such a way as to give amplified abrupt movement to the central portion thereof in a predetermined movement of the thermal-responsive element, the movement of said plunger toward said disk being limited by said support, and means for yieldingly resisting movement of the support.

SIDNEY P. VAUGHN.